April 20, 1926.
C. A. KRUSE
1,581,928
TRANSMISSION COVER FOR MOTOR VEHICLES
Filed May 4, 1925
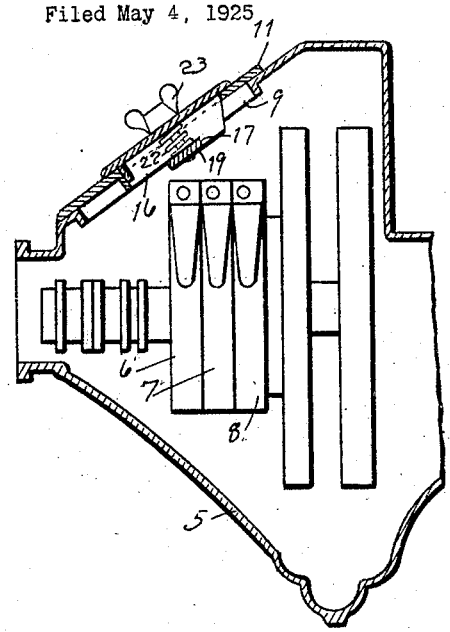
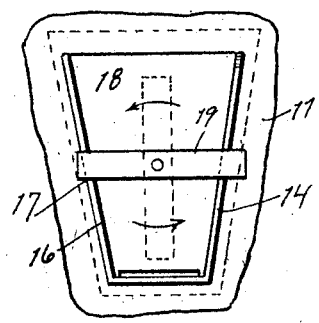
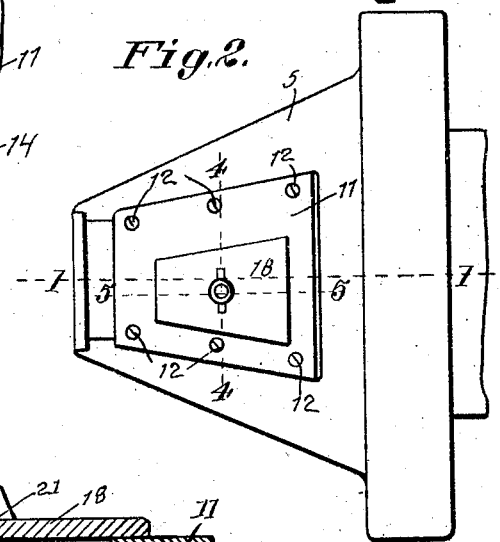
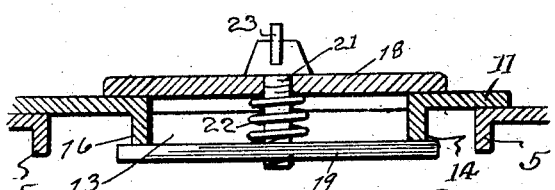
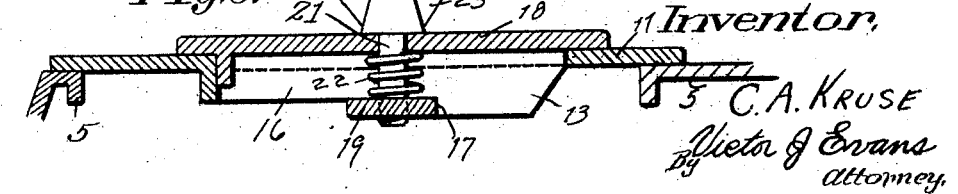
Inventor,
C. A. Kruse
By Victor J. Evans
Attorney.

Patented Apr. 20, 1926.

1,581,928

UNITED STATES PATENT OFFICE.

CHARLES A. KRUSE, OF SANTA ROSA, CALIFORNIA.

TRANSMISSION COVER FOR MOTOR VEHICLES.

Application filed May 4, 1925. Serial No. 27,918.

*To all whom it may concern:*

Be it known that I, CHARLES A. KRUSE, a citizen of the United States, residing at Santa Rosa, in the county of Sonoma and State of California, have invented new and useful Improvements in Transmission Covers for Motor Vehicles, of which the following is a specification.

This invention relates to improvements in transmission covers for motor vehicles, and has particular reference to a device to be attached to the cover of a motor vehicle preferably of the Ford type.

The principal object of this invention is to provide an auxiliary hand opening in the top of a transmission housing for the purpose of facilitating the rapid adjustment of the transmission bands.

Another object is to produce a device of this character which may be attached to the ordinary Ford transmission housing without altering the construction of the same.

A further object is to provide a device of this character which is simple in construction, and therefore cheap to manufacture.

Other objects and advantages will be apparent during the course of the following description.

In the accompanying drawings forming a part of this specification and in which like numerals are employed to designate like parts throughout the same, Figure 1 is a vertical cross-section of a transmission housing showing my device applied thereto, taken on the line 1—1 of Figure 2, Figure 2 is a top plan view of Figure 1, Figure 3 is a bottom plan view of the housing showing my device attached thereto, Figure 4 is a detail view taken on the line 4—4 of Figure 2, and Figure 5 is a detail view taken on the line 5—5 of Figure 2.

At the present time in order to tighten the transmission bands in a well known make of automobile, it is necessary to remove a number of screws from the cover plate of the transmission housing before the bands can be brought into view for adjustment. It is applicant's intention to provide an auxiliary cover plate which may be quickly removed by the manipulation of a single thumb nut so that adjusting mechanism of the bands may be uncovered for adjustment.

In the accompanying drawings wherein for the purpose of illustration is shown a preferred embodiment of my invention, the numeral 5 designates a transmission housing within which are mounted a plurality of transmission bands 6, 7 and 8. These bands underlie an opening 9 formed in the housing and normally closed by a cover plate 11. The cover plate 11 is normally held in place as by screws 12 (see Figure 2). These screws have to be removed in order to expose the transmission mechanism, and accordingly, I have cut an auxiliary opening 13 in the cover plate 11 and have provided the same with down-turned flanges 14 and 16. One of these flanges is provided with a downwardly projecting shoulder 17.

In order to close this opening 13, I have provided an auxiliary cover plate 18 which cover plate is held in place by a latching bar 19. This latching bar is carried upon the end of a screw-thread member 21 passing through the cover plate 18 and having threaded engagement therewith.

A spring 22 is interposed between the latching bar 19 and the cover plate 18 and surrounds the screw-thread member 21. A wing nut 23 serves to rotate the screw thread 21 when desired.

The manner of operating my device is as follows:—

Assuming that the parts are arranged as shown in Figures 1 and 2, rotation of the nut 23 will cause a loosening of the screw, thus allowing the bar 19 to move downwardly and out of engagement with the flanges 14 and 16. As soon as the same has moved a sufficient distance away from the flanges the friction of the spring 22 will cause the locking bar to rotate as indicated by the arrows of Figure 3 at which time the auxiliary cover plate 18 may be removed.

In replacing the cover plate, the operation is reversed, with the result that as the locking bar moves through its arc, one of the ends will come into contact with the shoulder 17 which will arrest further rotary movement with the result that the further movement of the screw 21 will merely serve to draw the locking bar into tighter engagement with the flanges 14 and 16.

It will thus be seen that I have provided a very simple device which through the manipulation of one screw will permit a person to quickly expose the adjusting nuts of the transmission.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described the combination with an automobile having a transmission housing, of a cover plate positioned thereon and having an opening formed in said cover plate, an auxiliary cover plate adapted to close the opening of said first mentioned cover plate, and a pivoted locking bar secured to said auxiliary plate, for the purpose specified.

2. In a device of the character described the combination with an automobile having a transmission housing, having an opening formed therein and downturned flanges surrounding the opening, a cover plate adapted to close the opening in said housing, and a locking bar pivotally supported by said cover plate and adapted to engage said flanges, for the purpose specified.

3. In a device of the character described the combination with an automobile transmission housing having a removable cover plate secured thereto, of an auxiliary cover plate secured to said first mentioned cover plate, said first mentioned cover plate having down-turn flanges formed therein and having an opening formed therebetween, one of said flanges being provided with a shoulder, a locking bar pivotally supported beneath said auxiliary cover plate, means for rotating said locking bar, a spring interposed between said locking bar and said auxiliary plate and surrounding said bar rotating means, said bar being adapted to contact said shoulder, for the purpose specified.

In testimony whereof I affix my signature.

CHARLES A. KRUSE.